United States Patent
Cho et al.

(10) Patent No.: US 9,784,344 B1
(45) Date of Patent: Oct. 10, 2017

(54) PLANETARY GEAR TRAIN OF AN AUTOMATIC TRANSMISSION FOR A VEHICLE

(71) Applicant: HYUNDAI MOTOR COMPANY, Seoul (KR)

(72) Inventors: Wonmin Cho, Hwaseong-si (KR); Seong Wook Hwang, Gunpo-si (KR); Hyun Sik Kwon, Seoul (KR); Ki Tae Kim, Incheon (KR); Jae Chang Kook, Hwaseong-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/374,674

(22) Filed: Dec. 9, 2016

(30) Foreign Application Priority Data

Oct. 12, 2016 (KR) .................. 10-2016-0132412

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 8,702,555 B1* | 4/2014 | Hart | F16H 3/66 475/278 |
| 2013/0231215 A1* | 9/2013 | Coffey | F16H 3/66 475/276 |
| 2016/0327131 A1* | 11/2016 | Lee | F16H 3/66 |
| 2016/0356344 A1* | 12/2016 | Ji | F16H 3/66 |

* cited by examiner

*Primary Examiner* — Justin Holmes
(74) *Attorney, Agent, or Firm* — Lempia Summerfield Katz LLC

(57) ABSTRACT

A planetary gear train of an automatic transmission for a vehicle includes at least ten forward speeds and one reverse speed. The planetary gear train includes an input shaft, an output shaft, four planetary gear sets respectively having three rotational elements, and six control elements for selectively interconnecting the rotational elements and a transmission housing.

10 Claims, 2 Drawing Sheets

FIG. 2

| Shift-stage | Control element | | | | | | Gear ratio |
|---|---|---|---|---|---|---|---|
| | C1 | C2 | C3 | C4 | B1 | B2 | |
| D1 |  |  | ● |  | ● | ● | 3.690 |
| D2 | ● |  | ● |  | ● |  | 2.500 |
| D3 |  | ● | ● |  | ● |  | 1.706 |
| D4 |  | ● | ● | ● | ● |  | 1.270 |
| D5 |  |  |  | ● | ● |  | 1.114 |
| D6 | ● |  |  | ● |  | ● | 1.000 |
| D7 |  |  | ● | ● | ● | ● | 0.934 |
| D8 |  | ● |  | ● |  | ● | 0.868 |
| D9 |  | ● |  | ● |  | ● | 0.820 |
| D10 |  |  | ● |  |  | ● | 0.529 |
| REV | ● |  | ● |  |  | ● | -2.000 |

PLANETARY GEAR TRAIN OF AN AUTOMATIC TRANSMISSION FOR A VEHICLE

CROSS-REFERENCE TO RELATED APPLICATION

This application claims priority to and the benefit of Korean Patent Application No. 10-2016-0132412 filed in the Korean Intellectual Property Office on Oct. 12, 2016, the entire contents of which are incorporated herein by reference.

BACKGROUND

(a) Field of the Disclosure

The present disclosure relates to a planetary gear train for an automatic transmission in a vehicle.

(b) Description of the Related Art

In the field of automatic transmissions, increasing the number of shift-stages is useful technology for enhancing fuel consumption and drivability of a vehicle. Increase in oil prices may make enhancing fuel consumption of a vehicle important.

Research for an engine has been made to achieve weight reduction and to enhance fuel efficiency through downsizing. Research on automatic transmissions has been performed to simultaneously provide better drivability and fuel consumption by achieving more shift stages.

In order to achieve more shift-stages for an automatic transmission, the number of parts is typically increased, which may hinder installation, production cost, weight and/or power flow efficiency.

In recent years, an eight-speed automatic transmission has been introduced. A planetary gear train for an automatic transmission enabling more shift-stages is currently under investigation.

An automatic transmission of eight or more shift-stages typically includes three to four planetary gear sets and five to seven control elements (frictional elements), and may increase the transmission length, thereby deteriorating installability.

In this regard, disposing planetary gear sets in parallel or employing dog clutches instead of wet-type control elements is sometimes attempted. However, such arrangements may not be widely applicable, and using dog clutches may deteriorate shift-feel.

The above information disclosed in this Background section is only to enhance understanding of the background of the disclosure. Therefore, the background may contain information that does not form the prior art that is already known in this country to a person of ordinary skill in the art.

SUMMARY

The present disclosure is directed to a planetary gear train for automatic transmission in a vehicle. The disclosed planetary gear train has the advantages of obtaining shift-stages of ten forward speeds and one reverse speed while still using a minimal number of parts. The disclosed planetary gear train improves power delivery, performance, and fuel consumption by utilizing the multi-stages of an automatic transmission. The disclosed planetary gear train also improves driving stability of a vehicle by utilizing a low rotation speed of an engine.

A planetary gear train according to an embodiment of the present disclosure includes an input shaft for receiving an engine torque; an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft connected with the first rotational element and the sixth rotational element; a second shaft connected with the second rotational element and the seventh rotational element; a third shaft connected with the third rotational element and the twelfth rotational element, connected with the input shaft, and selectively connected with the second shaft; a fourth shaft connected with the fourth rotational element; a fifth shaft connected with the fifth rotational element and selectively connected with the second shaft; a sixth shaft connected with the eighth rotational element, eleventh rotational element and connected with the output shaft; a seventh shaft connected with the ninth rotational element and selectively connected with the fourth shaft; and an eighth shaft connected with the tenth rotational element and selectively connected with the seventh shaft.

The fourth shaft and the fifth shaft may be selectively connected with a transmission housing respectively.

The first, second, and third rotational elements of the first planetary gear set may be respectively a first sun gear, a first planet carrier, and a first ring gear of the first planetary gear set. The fourth, fifth, and sixth rotational elements of the second planetary gear set may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

The first, second, third, and fourth planetary gear sets may be arranged in an order of the first, second, third, and fourth planetary gear sets from an engine side.

A planetary gear train according to an embodiment of the present disclosure may further include a first clutch selectively connecting the second shaft and the third shaft, a second clutch selectively connecting the second shaft and the fifth shaft, a third clutch selectively connecting the fourth shaft and the seventh shaft, a fourth clutch selectively connecting the seventh shaft and the eighth shaft, a first brake selectively connecting the fourth shaft and the transmission housing, and a second brake selectively connecting the fifth shaft and the transmission housing.

A planetary gear train according to an embodiment of the present disclosure may realize at least ten forward speeds and at least one reverse speed by operating the four planetary gear sets planetary gear sets by controlling six control elements.

In addition, a planetary gear train according to an embodiment of the present disclosure may substantially improve driving stability by realizing shift-stages that are appropriate for a rotational speed of an engine due to the multi-stages of an automatic transmission.

In addition, a planetary gear train according to an embodiment of the present disclosure maximizes engine driving efficiency by utilizing multi-stages of an automatic transmission, and may improve power delivery performance and fuel consumption.

Further, effects that may be obtained or expected from embodiments of the present disclosure are directly or suggestively described in the following detailed description. That is, various effects expected from embodiments of the present disclosure will be described in the following detailed description.

BRIEF DESCRIPTION OF THE DRAWINGS

FIG. 2 is an operational chart for respective control elements at respective shift-stages in a planetary gear train according to an embodiment of the present disclosure.

DETAILED DESCRIPTION OF THE EMBODIMENTS

Figure 1:
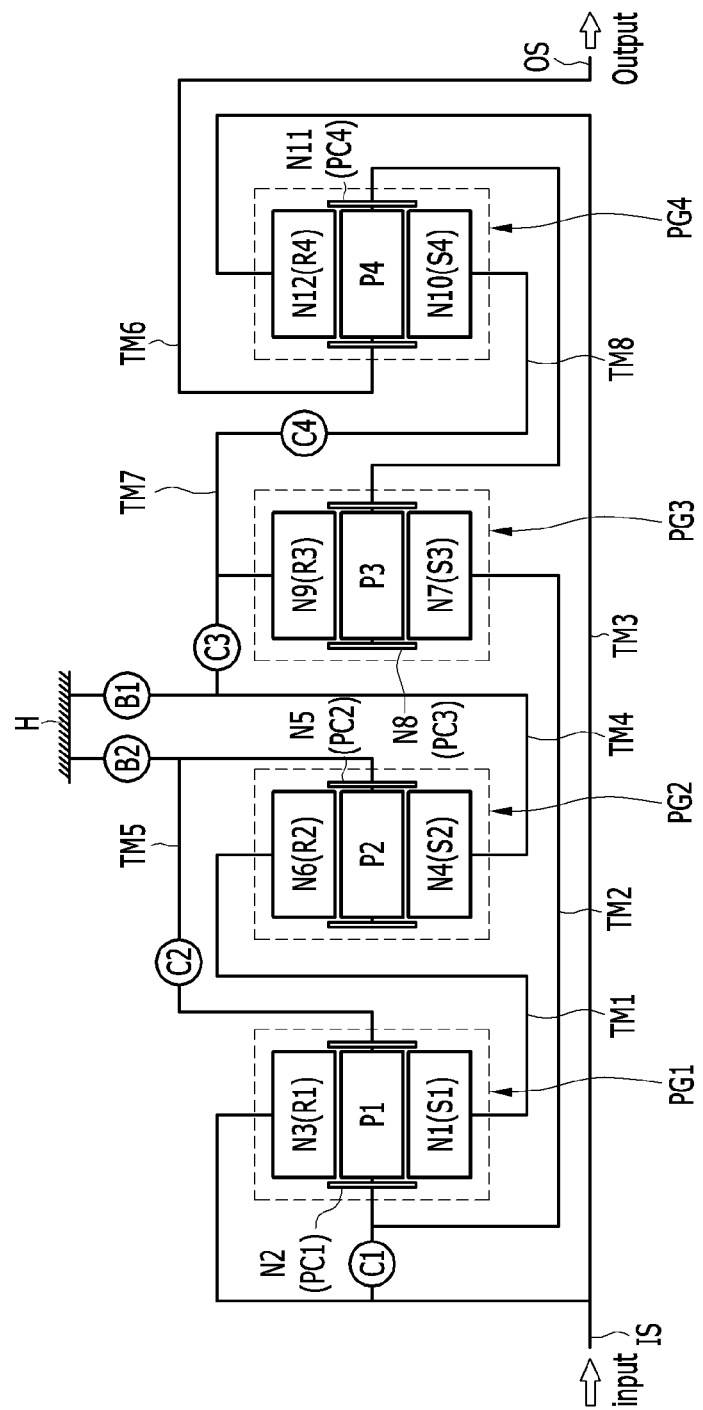
FIG. 1 is a schematic diagram of a planetary gear train according to an embodiment of the present disclosure.

The present disclosure will be described more fully hereinafter with reference to the accompanying drawings, in which embodiments of the disclosure are shown.

The drawings and description are to be regarded as illustrative in nature and not restrictive, and like reference numerals designate like elements throughout the specification. In the drawings, the following symbols are used to identify various elements of the disclosed embodiments, wherein:
i) B1, B2: first and second brakes;
ii) C1, C2, C3, C4: first, second, third, and fourth clutches;
iii) PG1, PG2, PG3, PG4: first, second, third, and fourth planetary gear sets;
iv) S1, S2, S3, S4: first, second, third, and fourth sun gears;
v) PC1, PC2, PC3, PC4: first, second, third, and fourth planet carriers;
vi) R1, R2, R3, R4: first, second, third, and fourth ring gears;
vii) IS: input shaft;
viii) OS: output shaft; and
ix) TM1, TM2, TM3, TM4, TM5, TM6, TM7, TM8: first, second, third, fourth, fifth, sixth, seventh, and eighth shafts.

In the following description, dividing names of components into first, second and the like, is to divide the names because the names of the components are the same as each other. The order or arrangement thereof is not particularly limited by the names.

FIG. 1 is a schematic diagram of a planetary gear train according to an embodiment of the present disclosure.

Referring to FIG. 1, a planetary gear train according to an embodiment of the present disclosure includes first, second, third, and fourth planetary gear sets PG1, PG2, PG3, and PG4 arranged on a same axis. In one embodiment, the planetary gear train also includes, an input shaft IS, output shaft OS, eight shafts TM1-TM8 connected with rotational elements of the first, second, third, and fourth planetary gear sets PG1, PG2, PG3, and PG4, control elements of four clutches C1-C4 and two brakes B1 and B2, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus (not shown).

In this embodiment, the first planetary gear set PG1 is a single pinion planetary gear set. The first planetary gear set PG1 includes a first sun gear S1, a first planet carrier PC1 that rotatably supports a plurality of first pinion gears P1 externally gear-meshed with the first sun gear S1, and a first ring gear R1 that is internally gear-meshed with the plurality of first pinion gears P1. The first sun gear S1 acts as a first rotational element N1, the first planet carrier PC1 acts as a second rotational element N2, and the first ring gear R1 acts as a third rotational element N3.

In this embodiment, the second planetary gear set PG2 is a single pinion planetary gear set. The second planetary gear set PG2 includes a second sun gear S2, a second planet carrier PC2 that rotatably supports a plurality of second pinion gears P2 externally gear-meshed with the second sun gear S2, and second ring gear R2 that is internally gear-meshed with the plurality of second pinion gears P2. The second sun gear S2 acts as a fourth rotational element N4, the second planet carrier PC2 acts as a fifth rotational element N5, and the second ring gear R2 acts as a sixth rotational element N6.

In this embodiment, the third planetary gear set PG3 is a single pinion planetary gear set. The third planetary gear set PG3 includes a third sun gear S3, a third planet carrier PC3 that rotatably supports a plurality of third pinion gears P3 externally gear-meshed with the third sun gear S3, and a third ring gear R3 that is internally gear-meshed with the plurality of third pinion gears P3. The third sun gear S3 acts as a seventh rotational element N7, the third planet carrier PC3 acts as an eighth rotational element N8, and the third ring gear R3 acts as a ninth rotational element N9.

In this embodiment, the fourth planetary gear set PG4 is a single pinion planetary gear set. The fourth planetary gear set PG4 includes a fourth sun gear S4, a fourth planet carrier PC4 that rotatably supports a plurality of fourth pinion gears P4 externally gear-meshed with the fourth sun gear S4, and a fourth ring gear R4 that is internally gear-meshed with the plurality of fourth pinion gears P4. The fourth sun gear S4 acts as a tenth rotational element N10, the fourth planet carrier PC4 acts as an eleventh rotational element N11, and the fourth ring gear R4 acts as a twelfth rotational element N12

In this embodiment the first, second, third, and fourth planetary gear sets PG1, PG2, PG3, and PG4, the first rotational element N1 and the sixth rotational element N6 are directly connected. The second rotational element N2 and the seventh rotational element N7 are directly connected. The third rotational element N3 and the twelfth rotational element N12 are directly connected. The eighth rotational element N8 and the eleventh rotational element N1 are directly connected. All of the foregoing connections are achieved by eight shafts TM1-TM8.

The eight shafts TM1-TM8 are arranged as follows.

Each of the eight shafts TM1-TM8 may be a rotational member that directly interconnects the input and output shafts and rotational elements of the planetary gear sets PG1, PG2, PG3, and PG4, or may be a rotational member that selectively interconnects a rotational element to the transmission housing H, or may be a fixed member that is fixed to the transmission housing H.

In this embodiment, the first shaft TM1 is connected with the first rotational element N1 (first sun gear S1) and the sixth rotational element N6 (second ring gear R2).

In this embodiment, the second shaft TM2 is connected with the second rotational element N2 (first planet carrier PC1) and the seventh rotational element N7 (third sun gear S3).

In this embodiment, the third shaft TM3 is connected with the third rotational element N3 (first ring gear R1) and the twelfth rotational element N12 (fourth ring gear R4). The third shaft TM3 is selectively connected with the second shaft TM2. The third shaft TM3 is directly connected with the input shaft IS, thereby acting as an input element.

In this embodiment, the fourth shaft TM4 is connected with the fourth rotational element N4 (second sun gear S2). The fourth shaft TM4 is selectively connected with the transmission housing H, thereby selectively acting as a fixed element.

In this embodiment, the fifth shaft TM5 is connected with the fifth rotational element N5 (second planet carrier PC2). The fifth shaft TM5 is selectively connected with the second shaft TM2 and selectively connected with the transmission housing H, thereby selectively acting as a fixed element.

The sixth shaft TM6 is connected with the eighth rotational element N8 (third planet carrier PC3) and the eleventh rotational element N11 (fourth planet carrier PC4). The sixth shaft TM6 is directly connected with the output shaft OS, thereby acting as an output element.

The seventh shaft TM7 is connected with the ninth rotational element N9 (third ring gear R3). The seventh shaft TM7 is also selectively connected with the fourth shaft TM4.

The eighth shaft TM8 is connected with the tenth rotational element N10 (fourth sun gear S4). The eighth shaft TM8 is also selectively connected with the seventh shaft TM7.

The eight shafts TM1-TM8, the input shaft IS, and the output shaft OS may be selectively interconnected with one another by control elements, i.e., the four clutches C1, C2, C3, and C4.

The eight shafts TM1-TM8 may be selectively connected with the transmission housing H, by control elements, i.e., the two brakes B1 and B2.

The four clutches C1-C4 and the two brakes B1 and B2 are described in further detail below.

In this embodiment, the first clutch C1 is arranged between the second shaft TM2 and the third shaft TM3. The first clutch C1 selectively connects the second shaft TM2 and the third shaft TM3, thereby controlling power delivery therebetween.

In this embodiment, the second clutch C2 is arranged between the second shaft TM2 and the fifth shaft TM5. The second clutch C2 selectively connects the second shaft TM2 and the fifth shaft TM5, thereby controlling power delivery therebetween.

In this embodiment, the third clutch C3 is arranged between the fourth shaft TM4 and the seventh shaft TM7. The third clutch C3 selectively connects the fourth shaft TM4 and the seventh shaft TM7, thereby controlling power delivery therebetween.

In this embodiment, the fourth clutch C4 is arranged between the seventh shaft TM7 and the eighth shaft TM8.

The fourth clutch C4 selectively connects the seventh shaft TM7 and the eighth shaft TM8, thereby controlling power delivery therebetween.

In this embodiment, the first brake B1 is arranged between the fourth shaft TM4 and the transmission housing H. The first brake B1 selectively connects the fourth shaft TM4 to the transmission housing H.

In this embodiment, the second brake B2 is arranged between the fifth shaft TM5 and the transmission housing H. The second brake B2 selectively connects the fifth shaft TM5 to the transmission housing H.

The control elements of the first clutch, second clutch, and third clutch C1, C2, and C3 and the first brake and second brake, B1 and B2 may be realized as multi-plate hydraulic pressure friction devices that are frictionally engaged by hydraulic pressure.

FIG. 2 is an operational chart for respective control elements at respective shift-stages in a planetary gear train according to an embodiment of the present disclosure.

Referring to FIG. 2, a planetary gear train according to an embodiment of the present disclosure realizes ten forward speeds and one reverse speed by operating three control elements among the first, second, third, and fourth clutches C1, C2, C3, and C4 and the first and second brakes B1 and B2 at respective shift-stages.

In this embodiment, in the forward first speed D1, the third clutch C3 and the first and second brakes B1 and B2 are simultaneously operated.

As a result, the fourth shaft TM4 is connected with the seventh shaft TM7 by the operation of the third clutch C3. In this state, the torque of the input shaft IS is input to the third shaft TM3.

In addition, the fourth shaft TM4 and the fifth shaft TM5 respectively act as fixed elements by the operation of the first and second brakes B1 and B2, thereby realizing the forward first speed by cooperative operation of respective shafts and outputting a shifted torque to the output shaft OS connected with the sixth shaft TM6.

In this embodiment, in the forward second speed D2, the first and third clutches C1 and C3 and the first brake B1 are simultaneously operated.

As a result, the second shaft TM2 is connected with the third shaft TM3 by the operation of the first clutch C1, and the fourth shaft TM4 is connected with the seventh shaft TM7 by the operation of the third clutch C3. In this state, the torque of the input shaft IS is input to the second shaft TM2 and the third shaft TM3.

In addition, the fourth shaft TM1 acts as a fixed element by the operation of the first brake B1, thereby realizing the forward second speed by cooperative operation of respective shafts and outputting a shifted torque to the output shaft OS connected with the sixth shaft TM6.

In this embodiment, in the forward third speed D3, the second and third clutches C2 and C3 and the first brake B1 are simultaneously operated.

As a result, the second shaft TM2 is connected with the fifth shaft TM5 by the operation of the second clutch C2, and the fourth shaft TM4 is connected with the seventh shaft TM7 by the operation of the third clutch C3. In this state, the torque of the input shaft IS is input to the third shaft TM3.

In addition, the fourth shaft TM1 acts as a fixed element by the operation of the first brake B1, thereby realizing the forward third speed by cooperative operation of respective shafts and outputting a shifted torque to the output shaft OS connected with the sixth shaft TM6.

In this embodiment, in the forward fourth speed D4, the third and fourth clutches C3 and C4 and the first brake B1 are simultaneously operated.

As a result, the fourth shaft TM4 is connected with the seventh shaft TM7 by the operation of the third clutch C3, and the seventh shaft TM7 is connected with the eighth shaft TM8 by the operation of the fourth clutch C4. In this state, the torque of the input shaft IS is input to the third shaft TM3.

In addition, the fourth shaft TM1 acts as a fixed element by the operation of the first brake B1, thereby realizing the forward fourth speed by cooperative operation of respective shafts and outputting a shifted torque to the output shaft OS connected with the sixth shaft TM6.

In this embodiment, in the forward fifth speed D5, the second and fourth clutches C2 and C4 and the first brake B1 are simultaneously operated.

As a result, the second shaft TM2 is connected with the fifth shaft TM5 by the operation of the second clutch C2, and the seventh shaft TM7 is connected with the eighth shaft TM8 by the operation of the fourth clutch C4. In this state, the torque of the input shaft IS is input to the third shaft TM3.

In addition, the fourth shaft TM1 acts as a fixed element by the operation of the first brake B1, thereby realizing the forward fifth speed by cooperative operation of respective shafts and outputting a shifted torque to the output shaft OS connected with the sixth shaft TM6.

In this embodiment, in the forward sixth speed D6, the first and fourth clutches C1 and C4 and the second brake B2 are simultaneously operated.

As a result, the second shaft TM2 is connected with the third shaft TM3 by the operation of the first clutch C1, and the seventh shaft TM7 is connected with the eighth shaft TM8 by the operation of the fourth clutch C4. In this state, the torque of the input shaft IS is input to the second shaft TM2 and the third shaft TM3.

In this case, the first, second, third, and fourth planetary gear sets PG1, PG2, PG3, and PG4 integrally rotate, and a torque is outputted as inputted, thereby forming the forward sixth speed and outputting a shifted torque to the output shaft OS connected with the sixth shaft TM6.

In this embodiment, in the forward seventh speed D7, the fourth clutch C4 and the first and second brakes B1 and B2 are simultaneously operated.

As a result, the seventh shaft TM7 is connected with the eighth shaft TM8 by the operation of the fourth clutch C4. In this state, the torque of the input shaft IS is input to the third shaft TM3.

In addition, the fourth shaft TM4 and the fifth shaft TM5 respectively act as fixed elements by the operation of the first and second brakes B1 and B2, thereby realizing the forward seventh speed, which is an overdrive gear, by cooperative operation of respective shafts and outputting a shifted torque to the output shaft OS connected with the sixth shaft TM6.

In this embodiment, in the forward eighth speed D8, the third and fourth clutches C3 and C4 and the second brake B2 are simultaneously operated.

As a result, the fourth shaft TM4 is connected with the seventh shaft TM7 by the operation of the third clutch C3, and the seventh shaft TM7 is connected with the eighth shaft TM8 by the operation of the fourth clutch C4. In this state, the torque of the input shaft IS is input to the third shaft TM3.

In addition, the fifth shaft TM5 acts as a fixed element by the operation of the second brake B2, thereby realizing the forward eighth speed, which is an overdrive gear, by cooperative operation of respective shafts and outputting a shifted torque to the output shaft OS connected with the sixth shaft TM6.

In this embodiment, in the forward ninth speed D9, the second and fourth clutches C2 and C4 and the second brake B2 are simultaneously operated.

As a result, the second shaft TM2 is connected with the fifth shaft TM5 by the operation of the second clutch C2, and the seventh shaft TM7 is connected with the eighth shaft TM8 by the operation of the fourth clutch C4. In this state, the torque of the input shaft IS is input to the third shaft TM3.

In addition, the fifth shaft TM5 acts as a fixed element by the operation of the second brake B2, thereby realizing the forward ninth speed, which is an overdrive gear, by cooperative operation of respective shafts and outputting a shifted torque to the output shaft OS connected with the sixth shaft TM6.

In this embodiment, in the forward tenth speed D10, the second and third clutches C2 and C3 and the second brake B2 are simultaneously operated.

As a result, the second shaft TM2 is connected with the fifth shaft TM5 by the operation of the second clutch C2, and the fourth shaft TM4 is connected with the seventh shaft TM7 by the operation of the third clutch C3. In this state, the torque of the input shaft IS is input to the third shaft TM3.

In addition, the fifth shaft TM5 acts as a fixed element by the operation of the second brake B2, thereby realizing the forward tenth speed, which is a highest forward gear, by cooperative operation of respective shafts and outputting a shifted torque to the output shaft OS connected with the sixth shaft TM6.

In this embodiment, in the reverse speed REV, the first, third clutch C1 and C3 and the second brake B2 are simultaneously operated.

As a result, the second shaft TM2 is connected with the third shaft TM3 by the operation of the first clutch C1, and the fourth shaft TM4 is connected with the seventh shaft TM7 by the operation of the third clutch C3. In this state, the torque of the input shaft IS is input to the second shaft TM2 and the third shaft TM3.

In addition, the fifth shaft TM5 acts as a fixed element by the operation of the second brake B2, thereby realizing the reverse speed by cooperative operation of respective shafts and outputting a shifted torque to the output shaft OS connected with the sixth shaft TM6.

As described above, a planetary gear train according to an embodiment of the present disclosure may realize at least ten forward speeds and one reverse speed by operating the four planetary gear sets PG1, PG2, PG3, and PG4 by controlling the four clutches C1, C2, C3, and C4 and the two brakes B1 and B2.

In addition, a planetary gear train according to an embodiment of the present disclosure may realize shift stages appropriate for rotation speed of an engine due to multi-stages of an automatic transmission and improve driving stability of a vehicle by utilizing a low rotation speed of an engine.

In addition, a planetary gear train according to an embodiment of the present disclosure maximizes engine driving efficiency through the multi-stages of an automatic transmission, and may improve power delivery performance and fuel consumption.

While this disclosure has been described in connection with what are presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
   an input shaft for receiving an engine torque;
   an output shaft for outputting a shifted torque;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   a first shaft connected with the first rotational element and the sixth rotational element;
   a second shaft connected with the second rotational element and the seventh rotational element;
   a third shaft connected with the third rotational element and the twelfth rotational element, connected with the input shaft, and selectively connected with the second shaft;
   a fourth shaft connected with the fourth rotational element;
   a fifth shaft connected with the fifth rotational element and selectively connected with the second shaft;
   a sixth shaft connected with the eighth rotational element, eleventh rotational element and connected with the output shaft;
   a seventh shaft connected with the ninth rotational element and selectively connected with the fourth shaft; and
   a eighth shaft connected with the tenth rotational element and selectively connected with the seventh shaft.

2. The planetary gear train of claim 1, wherein the fourth shaft and the fifth shaft are each selectively connected with the transmission housing.

3. The planetary gear train of claim 1, wherein:
   the first, second, and third rotational elements of the first planetary gear set are respectively a first sun gear, a first planet carrier, and a first ring gear of the first planetary gear set;
   the fourth, fifth, and sixth rotational elements of the second planetary gear set are respectively a second sun gear, a second planet carrier, and a second ring gear of the second planetary gear set;
   the seventh, eighth, and ninth rotational elements of the third planetary gear set are respectively a third sun gear, a third planet carrier, and a third ring gear of the third planetary gear set; and
   the tenth, eleventh, and twelfth rotational elements of the fourth planetary gear set are respectively a fourth sun gear, a fourth planet carrier, and a fourth ring gear of the fourth planetary gear set.

4. The planetary gear train of claim 1, wherein the first, second, third, and fourth planetary gear sets are arranged in an order of the first, second, third, and fourth planetary gear sets from an engine side.

5. The planetary gear train of claim 2, further comprising:
   a first clutch selectively connecting the second shaft and the third shaft;
   a second clutch selectively connecting the second shaft and the fifth shaft;
   a third clutch selectively connecting the fourth shaft and the seventh shaft;
   a fourth clutch selectively connecting the seventh shaft and the eighth shaft;
   a first brake selectively connecting the fourth shaft and the transmission housing; and
   a second brake selectively connecting the fifth shaft and the transmission housing.

6. A planetary gear train of an automatic transmission for a vehicle, the planetary gear train comprising:
   an input shaft for receiving an engine torque;
   an output shaft for outputting a shifted torque;
   a first planetary gear set having first, second, and third rotational elements;
   a second planetary gear set having fourth, fifth, and sixth rotational elements;
   a third planetary gear set having seventh, eighth, and ninth rotational elements; and
   a fourth planetary gear set having tenth, eleventh, and twelfth rotational elements,
   wherein the input shaft is connected with the third rotational element,
   the output shaft is connected with the eleventh rotational element,
   the first rotational element is connected with the sixth rotational element,
   the second rotational element is connected with the seventh rotational element,
   the third rotational element is connected with the twelfth rotational element,
   the eighth rotational element is connected with the eleventh rotational element,
   the second rotational element is selectively connected with each of the third and fifth rotational elements, and
   the ninth rotational element is selectively connected with the fourth and tenth rotational elements.

7. The planetary gear train of claim 6, wherein the fourth rotational element and the fifth rotational element are each selectively connected with the transmission housing.

8. The planetary gear train of claim 6, wherein:
   the first, second, and third rotational elements of the first planetary gear set are respectively a first sun gear, a first planet carrier, and a first ring gear of the first planetary gear set;
   the fourth, fifth, and sixth rotational elements of the second planetary gear set are respectively a second sun gear, a second planet carrier, and a second ring gear of the second planetary gear set;
   the seventh, eighth, and ninth rotational elements of the third planetary gear set are respectively a third sun gear, a third planet carrier, and a third ring gear of the third planetary gear set; and
   the tenth, eleventh, and twelfth rotational elements of the fourth planetary gear set are respectively a fourth sun gear, a fourth planet carrier, and a fourth ring gear of the fourth planetary gear set.

9. The planetary gear train of claim 6, wherein the first, second, third, and fourth planetary gear sets are arranged in an order of the first, second, third, and fourth planetary gear sets from an engine side.

10. The planetary gear train of claim 7, further comprising:
    a first clutch selectively connecting the second rotational element and the third rotational element;
    a second clutch selectively connecting the second rotational element and the fifth rotational element;
    a third clutch selectively connecting the fourth rotational element and the ninth rotational element;

a fourth clutch selectively connecting the ninth rotational element and the tenth rotational element;
a first brake selectively connecting the fourth rotational element and the transmission housing; and
a second brake selectively connecting the fifth rotational element and the transmission housing.

* * * * *